Jan. 29, 1935.  H. SCHNAITTACHER  1,989,382
BUST PROTECTOR
Filed Dec. 28, 1933
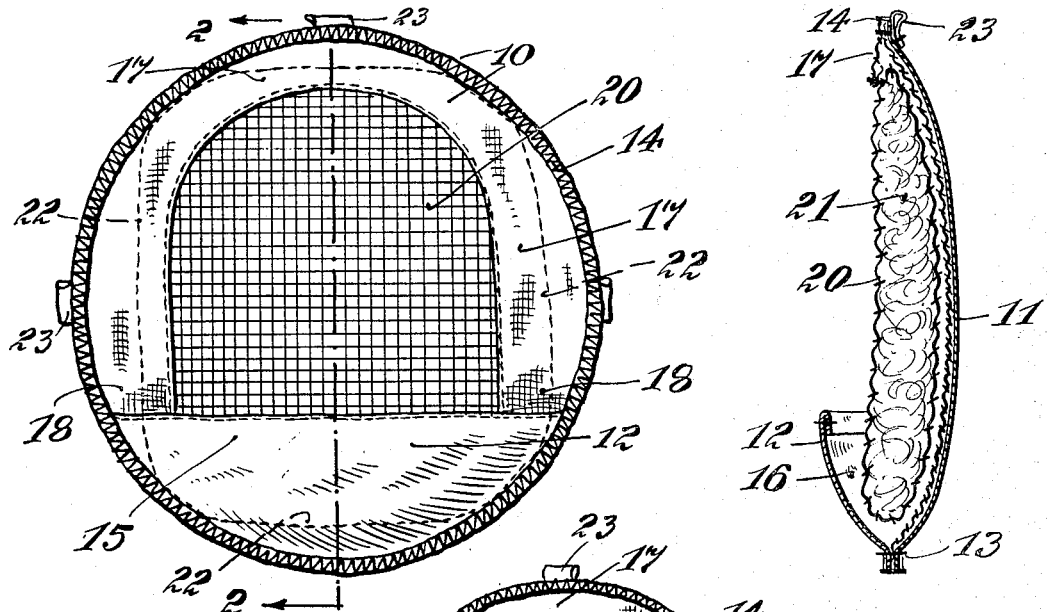
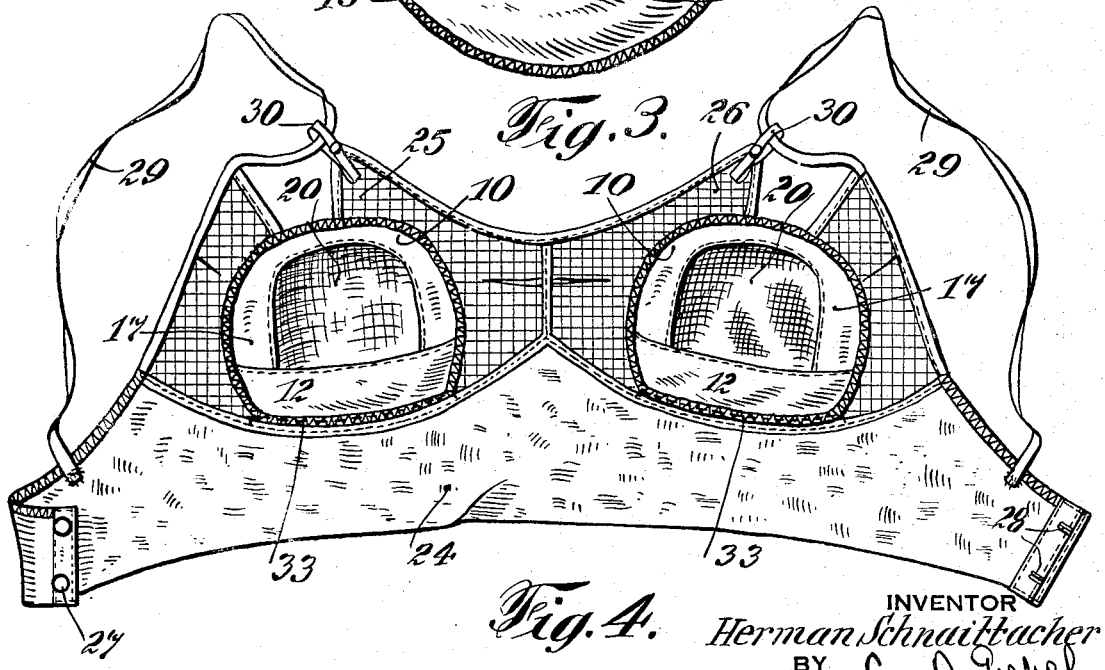
INVENTOR
Herman Schnaittacher
BY C. A. Joepel.
his ATTORNEY Patented Jan. 29, 1935

1,989,382

UNITED STATES PATENT OFFICE 1,989,382

BUST PROTECTOR

Herman Schnaittacher, New York, N. Y., assignor to Venus Corporation, New York, N. Y., a corporation of New York Application December 28, 1933, Serial No. 704,270

1 Claim. (Cl. 128—280)

This invention relates to bust protectors, and has for its particular object to provide a novel bust protector intended for nursing mothers. It has been found that nursing mothers often soil their dresses due to an abundance of milk flow. Embodiments of the invention provide a reservoir-like portion, and a pad-holding portion, which are of suitable waterproofing material, wherein a replaceable pad may be readily inserted therein or removed therefrom. The protector may also be readily attached to a brassière, which attachment in turn may be such as to be easily separated, when it is desired to remove the protector from the brassière.

The invention will be further described, and embodiments thereof shown in the drawing, and the invention will be finally pointed out in the claim.

In the drawing,

Figure 1 is a front view of my improved protector, with a pad enclosed;

Figure 2 is a vertical section on line 2—2 of Figure 1;

Figure 3 is a front view without the pad, and

Figure 4 is a front view of a brassière with my protector attached thereto.

Similar characters of reference indicate similar views throughout the various parts.

Referring to the drawing, the protector 10 consists of a circular shaped piece of waterproofing material or disc 11 forming the front side of the protector. To the inner part thereof, a segmentally shaped piece of waterproofing material 12 is attached to the disc 11 along its circular peripheral portion by stitching or the like, as shown by 13. Fancy stitching 14 may be provided to enhance the appearance of the protector. The upper part of the segmental portion is preferably straight as shown by 15. This segmental portion 12 so attached, forms a cup portion 16, wherein any fluid may be held, so as not to leak out of the cup portion due to the tightness of the stitching and the character of the waterproofing material used. Above the portion 12 is a holding portion 17, which is generally U shaped and which has its outward circular portion stitched to the peripheral portion of the disc 11, and its two ends 18, which are straight, stitched to the upper straight edge 15 of the portion 12. The inner U shaped edge 19 of the portion 17 is left free. The width of the portion 17 is such that it acts to hold thereunder a replaceable pad 20. This pad consists of a netted material surrounding an absorbent cotton interior portion 21, or the entire pad can be made of a material of absorbent character throughout in the well known manner. It extends from the lower portion to the upper portion of the disc 11, and to the sides thereof, and is generally of a square shape, as indicated in dotted lines 22 in Figure 1. The protector with a pad therein serves as a separate article of manufacture, and as a self contained entity, and the pad can be readily removed from its enveloping container. It can be provided with suitable supporting element straps 23 at different portions of its periphery. The protector is preferably circular in shape about six inches in diameter, and a half inch in depth, and is of a suitable color, preferably pink. When sewed to a brassière the lower portion is somewhat straightened, as shown.

The interior protector serves on the one hand as a very agreeable article of dress, due to its softness and yieldability, and on the other hand, serves as a collector in the waterproof pocket 16 for any excess fluid, keeping it from coming in contact with the dress of the wearer.

The brassière shown in Figure 4 is of the usual kind, with a body portion 24 and two bust portions 25 and 26, and the body portion has fastening means 27 and 28. The bust portions have shoulder straps 29, adjustable by passing through loops 30, to conform the brassière to various sizes of busts. The improved protectors above described, are fastened by sewing at 33 to the brassière, or any other suitable detachable means can be used. The bottom edge remains loose in respect to the brassière itself.

My invention has been illustrated and described with some degree of particularity, but it is understood that changes may be made in the form of details and in the arrangement of parts without departing from the spirit and scope of the invention or the scope of the appended claim.

I claim:

A bust protector consisting of a cover member, a U shaped inner member, a bottom member having an elongated upper edge transversely of the cover member, said U shaped member and bottom member being secured to the cover member circumferentially thereof, the ends of the U being fastened to the upper edge of the bottom member, thereby forming a pocket with the cover for holding a pad of absorbent material.

HERMAN SCHNAITTACHER.